Figure 1A:
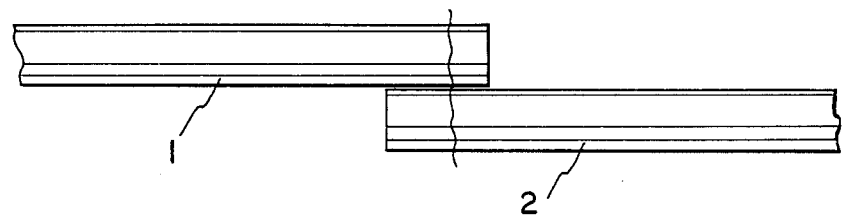

United States Patent [19]

Lande

[11] Patent Number: 4,953,775
[45] Date of Patent: Sep. 4, 1990

[54] METHOD OF EFFECTING A SINGLE JOINT BETWEEN TWO PIPES

[75] Inventor: Goran Lande, Stockholm, Sweden
[73] Assignee: Norabel AB, Nora, Sweden
[21] Appl. No.: 168,156
[22] Filed: Mar. 15, 1988
[30] Foreign Application Priority Data
  Apr. 7, 1987 [SE] Sweden .................................. 8701441
[51] Int. Cl.[5] ............................................ B23K 20/08
[52] U.S. Cl. ....................................... 228/107; 228/2.5
[58] Field of Search ................ 228/107, 108, 109, 2.5, 228/49.3

[56] References Cited

U.S. PATENT DOCUMENTS

| | | | |
|---|---|---|---|
| 4,641,775 | 2/1987 | Lande et al. .......................... | 228/2.5 |
| 4,669,649 | 6/1987 | Persson ................................. | 228/2.5 |
| 4,746,150 | 5/1988 | Persson et al. ....................... | 228/2.5 |

FOREIGN PATENT DOCUMENTS

| | | | |
|---|---|---|---|
| 488317 | 6/1976 | Australia ............................. | 228/107 |
| 287535 | 10/1988 | European Pat. Off. ............ | 228/107 |
| 1439142 | 6/1976 | United Kingdom ................ | 228/107 |
| 2142997 | 1/1985 | United Kingdom ................ | 228/107 |

Primary Examiner—Richard K. Seidel
Assistant Examiner—Samuel M. Heinrich
Attorney, Agent, or Firm—Dennison, Meserole, Pollack & Scheiner

[57] ABSTRACT

The invention relates to a method of effecting a single joint between two pipes of the pipe-line type by means of explosion welding, without the pipes being displaced in axial direction. This is achieved by moving an inner peripheral body (9) for welding between the pipe sections, to the joining point with the aid of a displacement unit expandable in axial direction.

5 Claims, 4 Drawing Sheets

METHOD OF EFFECTING A SINGLE JOINT BETWEEN TWO PIPES

The present invention relates to a method of effecting a joint, such as a repair joint, between two pipe ends, preferably of metal, which pipes may be of the pipe-line type suitable for transporting gas or oil, or pipes for district heating.

Various methods of effecting producing joints using explosion welding are already known. Examples are described in SE 8206913-9, SE 8303264-9 and SE 8402584-0. An inner peripheral body is arranged inside the joining point and an outer peripheral body is arranged outside the joining point, the latter body serving as a counter-support and, if desired, also as a mechanical joint. The inner peripheral body is explosion-welded at the joining point with the aid of explosive.

However, these joints are primarily intended for the production of pipes. Splicing sleeves welded to the pipe ends are used when it comes to repairing joints. Two explosion joints are required for this, and the explosive charges must be initiated simultaneously. This method of repairing pipes using double welds has certain drawbacks. It is difficult, not to say impossible, to achieve simultaneous initiation of the charges. There is also a risk of recoil of the detonation wave, resulting in undesired expansion of the pipes. These and other drawbacks are eliminated by means of the method according to the invention. The method does not require qualified welders and is characterised in that the pipe ends are arranged opposite each other without axial displacement, and abutting or substantially abutting each other, by removing a part of one or both pipes, that an inner peripheral body is inserted into one of the pipe ends, together with an explosive charge with detonator, the peripheral body with explosive charge being inserted fully inside the edge of the pipe end and connected to a displacement unit for displacing the peripheral body with explosive charge in axial direction, that an outer peripheral body in the nature of a pipe or ring is arranged around the outer surface of one of the pipe ends, the peripheral body being located leaving the edge of the pipe end exposed, that the inner peripheral body with explosive charge is centered over the transition between the pipe ends by the displacement unit, that the outer peripheral body is also located over the transition between the pipe ends and that the inner peripheral body is joined to the pipe ends by means of explosion welding, the outer peripheral body serving as support.

Additional features of the invention are revealed in the following description and claims.

Figure 1B:
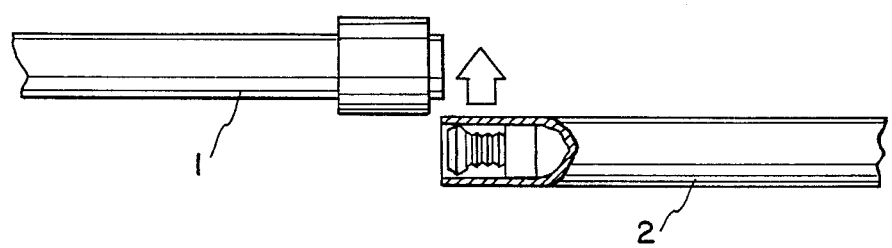
Figure 3:
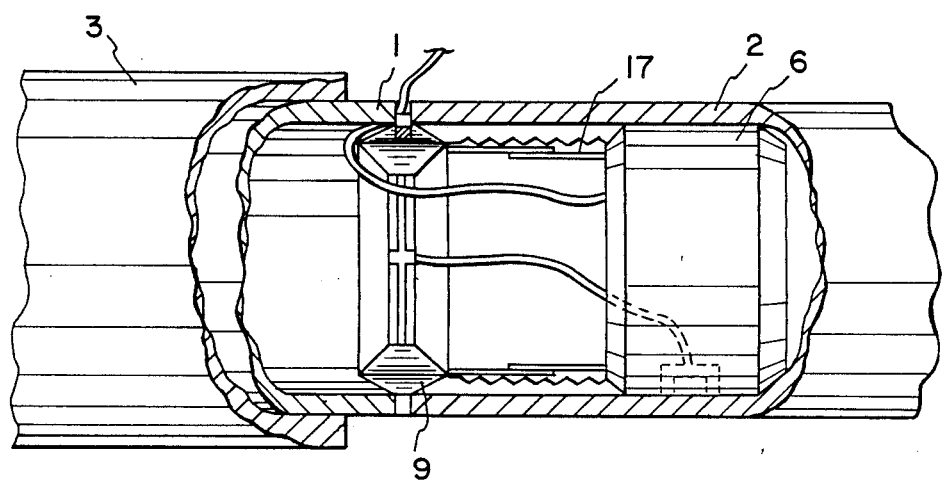
Figure 2A:
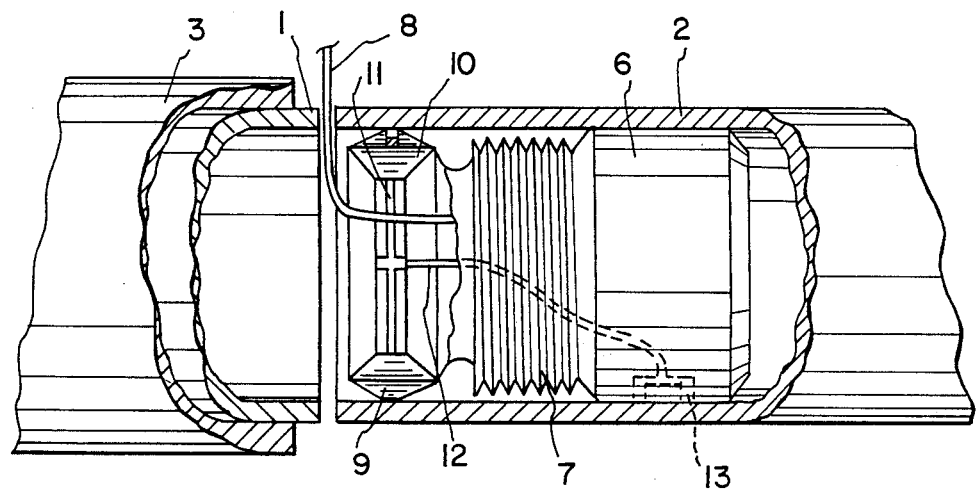
Figure 2B:
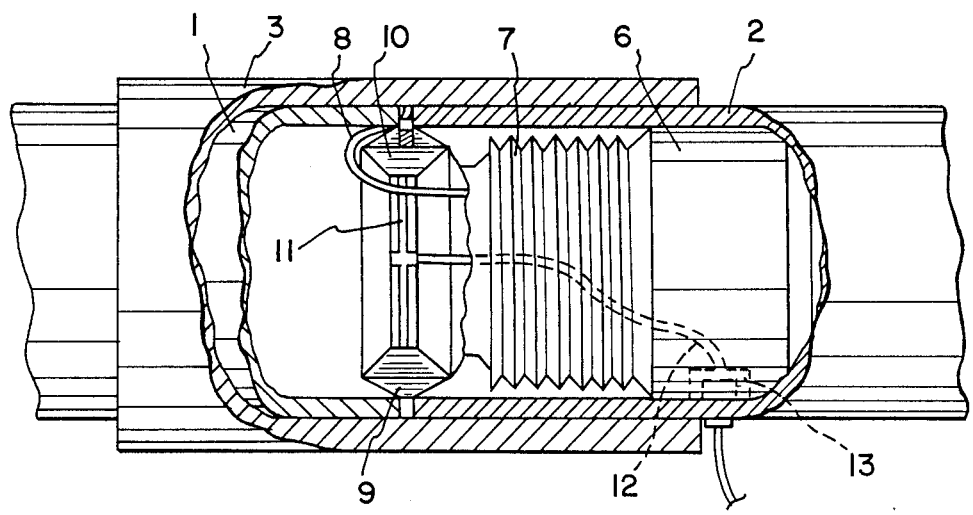

Embodiments of the invention will now be described with reference to the accompanying drawings in which FIGS. 1A and 1B show two pipes to be joined without axial displacement, FIGS. 2A and 2B show a displacement unit according to the invention, and FIG. 3 shows an alternative embodiment of the displacement unit according to the invention.

In the drawings 1 and 2 designate the pipe ends to be joined. A support ring 3, here in the form of a wound ring, is arranged on the pipe end 1. An inner peripheral body or overlap ring 9 with triangular cross section is arranged in the pipe end 2. An explosive charge 10, tubular in shape and initiated by a detonator, is arranged in the overlap ring 9. A displacement unit for the overlap ring 9 and explosive charge 10 is arranged inside the pipe 2. The displacement unit consists of an inflatable section 6, functioning as anchoring and retaining member in the pipe. When section 6 is inflated, e.g. with the aid of a pneumatic pump outside the pipe, via a tube 8, this section 6 will expand and in due course will rest against the inner surface of the pipe. The retaining force is determined by the pressure and the choice of material. An expandable bellows 7 is located between the inflatable section 6 and overlap ring 9, as shown in FIGS. 2A and 2B. The bellows 7 can expand in axial direction. When the bellows 7 expands, the end attached to the anchoring ring 6 remains in place while the other end moves out in axial direction towards the edge of the pipe 2. The overlap ring 9 with explosive charge 10 is thus also moved out towards the edge of the pipe.

FIG. 3 shows an alternative to the expandable bellows 7, i.e. a telescopic guide 17 in the form of cylinders axially displaceable in relation to each other. One of these cylinders is secured to the anchoring ring 6 while the other is secured to the overlap ring 9 for displacement thereof.

The bellows 7 or telescopic guide 17 can be expanded in the same way as the inflatable section 6 by pumping in air from a device located externally. The units 6 and 7 or 17, respectively, may communicate with each other or may be separate. Expansion of the displacement unit may be effected chemically instead of with the aid of a pneumatic pump. Inflation of the unit 6 and expansion of the unit 7 or 17 may also be achieved by a combination of chemical reaction and pumping in air.

A suitable material for the displacement unit is plastic. The material shall be such that neither the inner wall of the pipe, nor any lining present, is damaged by the detonation. When the overlap ring 9 with charge 10 has been displaced, the displacement unit will collapse and does not therefore obstruct symmetric dispersion of the shock wave.

Pipe 1 and/or pipe 2 are cut as shown in FIGS. 1A and 1B, thus producing a narrow space between the pipe ends. No axial displacement is then required to join the ends, but merely radial displacement. The support ring 3 is drawn a short way over the pipe end 1 and the displacement unit 6,7 or 6,17, respectively, with overlap ring 9, charge 10 and requisite detonation devices 11,12,13, etc. are placed in the pipe 2. The overlap ring 9 is placed nearest the edge of the pipe. The tube 8 from the pneumatic pump may be inserted through the space between the pipe ends, to section 6 and/or section 7 of the displacement unit. Instead of supplying air from a pneumatic pump, or to supplement this system, a chemical detonator may be placed at any suitable place in the displacement unit. Alternatively, displacement of the overlap ring may be effected mechanically.

The pipe ends are aligned opposite each other. Then, when the retaining section 6 has been securely clamped in pipe 2, the expandable section 7 or 17 is permitted to expand. This expansion causes the overlap ring 9 with charge 10 to be displaced towards the edge of the pipe 2. When the overlap ring 9 reaches the gap between the pipes, it is fixed there by means of a snap arrangement on the ring, for instance, after which the displacement unit is allowed to collapse.

The support ring 3 is then centered over the space between the pipes. The detonator 13, e.g. an induction detonator, initiates the charge and the overlap ring is welded to the inner surfaces of the two pipe ends, thus producing the joint.

In the embodiment shown the support ring and overlap ring with charge have been placed on different pipe ends. Alternatively, both rings may be placed initially on the same pipe end. Furthermore, the single joint according to the invention has been described for use in repair work. Obviously, however, the joint can be used for other purposes where axial displacement is impossible.

I claim:

1. A method for effecting a single joint between the ends of two pipes, comprising the steps of:

inserting into the end of one said pipe a displacement device and peripherally anchoring said displacement device to the inner surface of the pipe;

inserting into the end of said one said pipe with displacement device a single inner peripheral body including explosive charge and detonator, said inner peripheral body being located between said displacement device and the pipe end;

arranging an outer peripheral body around the outer surface of one of the pipes, leaving the pipe end exposed;

arranging said pipes such that the ends are opposite each other without axial displacement, and substantially abutting each other;

expanding the anchored displacement device in the axial direction so as to cause the inner peripheral body to move toward the pipe ends and be centered between the pipe ends, and subsequently collapsing said displacement device so that it is no longer anchored;

locating said outer peripheral body over the pipe ends; and detonating the explosive so as to explosion weld the pipe ends, with the single inner peripheral body joined to the pipe ends and the outer peripheral body serving as a support.

2. A method according to claim 1, wherein said displacement device is connected to the part of the inner peripheral body where the explosive charge is located.

3. A method according to claim 1, where the displacement device is anchored by inflating a portion thereof such that the periphery of said portion contacts the inner surface of the pipe.

4. A method according to claim 3, wherein said displacement device is expanded in the axial direction by inflating a bellows.

5. A method according to claim 3, wherein said displacement device is expanded in the axial direction by telescoping a portion thereof in the direction of said inner peripheral body.

* * * * *